US008292606B2

(12) United States Patent
Owen

(10) Patent No.: US 8,292,606 B2
(45) Date of Patent: Oct. 23, 2012

(54) MOLD FOR TIRE WITH FLOATING MOLD BACK RING

(75) Inventor: Marvin G. Owen, Williamston, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/001,413

(22) PCT Filed: May 15, 2009

(86) PCT No.: PCT/US2009/044166
§ 371 (c)(1),
(2), (4) Date: Dec. 24, 2010

(87) PCT Pub. No.: WO2009/158076
PCT Pub. Date: Dec. 30, 2009

(65) Prior Publication Data
US 2011/0104317 A1    May 5, 2011

(30) Foreign Application Priority Data

Jun. 27, 2008    (WO) ................ PCT/US2008/068619

(51) Int. Cl.
B29C 35/02    (2006.01)
(52) U.S. Cl. ............................................ 425/46; 425/47
(58) Field of Classification Search .................... 425/46, 425/47
See application file for complete search history.

(56) References Cited

U.S. PATENT DOCUMENTS

| 3,460,197 | A | | 8/1966 | Cantarutti et al. |
| 3,464,090 | A | | 8/1969 | Cantarutti et al. |
| 3,730,658 | A | | 5/1973 | Marra |
| 3,778,203 | A | | 12/1973 | MacMillan |
| 3,787,155 | A | | 1/1974 | Zangl |
| 3,806,288 | A | * | 4/1974 | Materick ......................... 425/46 |
| 3,901,632 | A | | 8/1975 | Prosdocimi |
| 3,910,735 | A | * | 10/1975 | Caretta ........................... 425/46 |
| 3,922,122 | A | * | 11/1975 | Bottasso et al. ................ 425/46 |

(Continued)

FOREIGN PATENT DOCUMENTS
DE    1901130 A1    7/1970
(Continued)

OTHER PUBLICATIONS

PCT/US/2009/044166—International Search Report dated Jun. 24, 2009.

(Continued)

*Primary Examiner* — James Mackey
(74) *Attorney, Agent, or Firm* — Hahn Loeser & Parks LLP; Bret A. Hrivnak, Esq.

(57) ABSTRACT

A tire curing mold capable of operating between open and closed positions includes a first plurality of translatable sections, the sections translatable between open and closed positions and one or more first side plates positioned for engagement with the first plurality of translatable sections when the sections are in the closed position. The tire curing mold also includes a first mold back ring slidably engaging the first plurality of sections and slidably attached to a first base plate, and a first plurality of displacement members extending between the first base plate and the first mold back ring, the one or more displacement members applying a closing force against the first mold back ring to force the first plurality of translatable sections into the closed position.

20 Claims, 8 Drawing Sheets

U.S. PATENT DOCUMENTS

| | | | |
|---|---|---|---|
| 3,990,823 | A | 11/1976 | Le Moullac |
| 4,013,390 | A | 3/1977 | Moeller et al. |
| 4,022,554 | A | 5/1977 | MacMillan |
| 4,068,989 | A | 1/1978 | Cantarutti |
| 4,608,219 | A | 8/1986 | Singh et al. |
| 4,828,471 | A | 5/1989 | Schlautmann |
| 4,883,415 | A | 11/1989 | Salvadori |
| 5,120,209 | A | 6/1992 | MacMillan |
| 5,165,939 | A | 11/1992 | Pizzorno |
| 5,190,767 | A | 3/1993 | Beres et al. |
| 5,208,044 | A | 5/1993 | Miyata et al. |
| 5,234,326 | A | 8/1993 | Galli et al. |
| 5,466,140 | A | 11/1995 | Imler et al. |
| 5,676,980 | A | 10/1997 | Gulka et al. |
| 6,017,206 | A | 1/2000 | Soulaliox |
| 6,318,985 | B1 | 11/2001 | Heindel et al. |
| 6,632,393 | B2 | 10/2003 | Fike |
| 6,669,457 | B2 | 12/2003 | Scarzello et al. |
| 6,716,013 | B2 | 4/2004 | Fike |
| 6,808,377 | B1 | 10/2004 | Loney et al. |
| 6,841,113 | B2 | 1/2005 | Caretta |
| 7,189,069 | B2 | 3/2007 | Yovichin et al. |
| 7,314,361 | B2 | 1/2008 | Matsumoto et al. |
| 7,976,299 | B2 * | 7/2011 | Sano et al. ............ 425/46 |
| 8,016,578 | B2 | 9/2011 | Secchi et al. |
| 2004/0046286 | A1 | 3/2004 | Seko et al. |
| 2005/0226951 | A1 | 10/2005 | Kata |

FOREIGN PATENT DOCUMENTS

| | | |
|---|---|---|
| DE | 3208080 | 10/1982 |
| GB | 1248891 A | 10/1971 |
| JP | 61-003711 A | 1/1986 |
| JP | 2001-205634 * | 7/2001 |
| JP | 2005-081617 A | 3/2005 |
| WO | 2008/065463 A1 | 6/2008 |

OTHER PUBLICATIONS

PCT/US2009/044166—International Written Opinion dated Jun. 24, 2009.

PCT/US2008/068619—International Search Report dated Nov. 24, 2008.

PCT/US2008/068619—International Written Opinion dated Nov. 24, 2008.

DE1901130A1—English abstract obtained from Derwent Information Ltd obtained on Mar. 24, 2012, 1 page.

JP61-003711A—English abstract obtained from Patent Abstracts of Japan (http://www19.ipdl.inpit.go.jp) obtained on May 8, 2012, 1 page.

JP2005-081617A—English abstract and machine translation obtained from Patent Abstracts of Japan (http://www.19.ipdl.go.jp) obtained on May 8, 2012, 8 pages.

JP2001-205634A—English abstract and machine translation obtained from Patent Abstracts of Japan (http://www4.ipdl.inpit.go.jp/Tokujitu/tjsogodbenk.ipdl) obtained on May 9, 2012, 12 pages.

* cited by examiner

MOLD FOR TIRE WITH FLOATING MOLD BACK RING

This application is a National Stage application of International Application No. PCT/US2009/044166, filed May 15, 2009, which claims priority to International Application No. PCT/US2008/068619, filed Jun. 27, 2008, to each of which this application claims priority and the benefit of, the disclosure of each being hereby incorporated by reference.

BACKGROUND OF THE INVENTION

1. Field of the Invention

The invention relates generally to curing molds, and, more specifically, to apparatus for controlling the opening and/or closing of split-type and/or segmented curing molds.

2. Description of the Related Art

Molds for curing objects, such as tires, etc., may comprise a split mold. A split mold generally includes an upper mold portion and a lower mold portion, each of which translate vertically between open and closed positions. Each of the upper and lower portions of the mold may generally be segmented into a plurality of arcuate sections. During or subsequent vertical translation, the sections of the upper and lower portions translate outwardly in a radial direction. The radial translation of the sections facilitates the demolding of the cured object. For example, a tire having a complex tread design may be difficult to de-mold without the radial portion of the mold translating outwardly, as portions of the mold sections would remain within the molded tread to resist any force attempting to lift the tire vertically from the mold.

Because a split-type, segmented mold generally includes a plurality of interoperable mold components, it is important that the mold components collapse inwardly to properly engage adjacent components of the mold in a closed mold position, to eliminate the formation of any gaps there between. This is especially important with intersections located about the tire cavity formed in the mold. Gaps may result from improperly designed or worn components. The formation of gaps about the tire cavity results in the formation of flash along associated portions of the cured tire. Flash is rubber that is forced between adjacent mold components by pressurization encountered during the tire curing process. Flash results in a loss of rubber, which may be detrimental to the formation and integrity of the corresponding tire. It may also cause misalignment in the tread area, which may prevent the proper formation of intricate tread elements. In an effort to alleviate this problem, the various mold components are designed and formed with high precision to provide a tight fit. This requires significant effort and cost. Further, alignment mechanisms may be used in the mold to promote proper alignment of mold components during mold closing operations, for the purpose of reducing wear along the edges of mold components. Accordingly, there is a need for a mechanism that accommodates and overcomes the effects of wear and inexactly designed and manufactured mold components, each of which could form gaps along the mold cavity.

SUMMARY OF THE INVENTION

Particular embodiments of the present invention include a tire curing mold capable of operating between mold open and mold closed positions, the mold including a first plurality of translatable sections, the sections translatable between open and closed positions. The mold also includes one or more first side plates positioned for engagement with the first plurality of translatable sections when the sections are in the closed position, and a first mold back ring slidably engaging the first plurality of sections and slidably attached to a first base plate. The mold also includes a first plurality of displacement members extending between the first base plate and the first mold back ring at a plurality of locations around the mold, the one or more displacement members applying a closing force against the first mold back ring to force the first plurality of translatable sections into the closed position.

Particular embodiments of the curing mold may also include a second plurality of translatable sections, the sections translatable between open and closed positions, the second plurality of sections engaging one or more second side plates in the closed position. Particular embodiments may also include a second mold back ring slidably engaging the second plurality of sections and slidably attached to a second base plate, and a second plurality of displacement members extending between the second base plate and the second mold back ring at a plurality of locations around the mold, the second plurality of displacement members applying a closing force against the second mold back ring to force the second plurality of translatable sections into the closed position.

Particular embodiments of the curing mold the plurality of first section members are upper section members, the one or more first side plates are upper side plates, the first mold back ring is an upper mold back ring, the first base plate is an upper base plate, the plurality of second section members are lower section members, the one or more second side plates are lower side plates, the second mold back ring is a lower mold back ring, the second base plate is a lower base plate.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
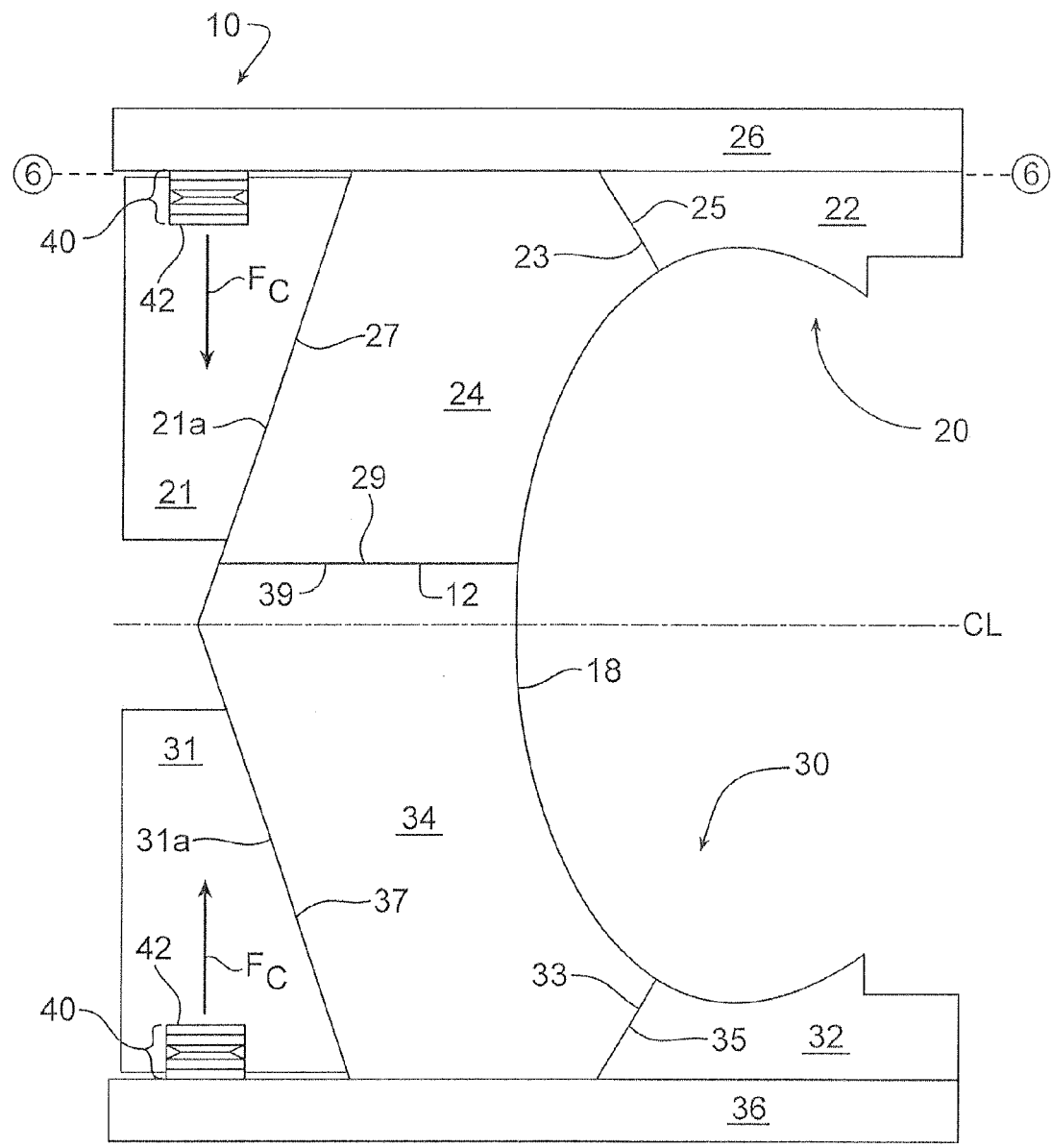
FIG. 1 is a partial sectional side view of a tire curing mold, according to an embodiment of the invention, showing two (2) groupings of displacement members (non-sectional side view) at a location around the sectioned curing mold.

Particular embodiments of the present invention provide apparatus for controlling the opening and closing of a curing mold, and more specifically, a split-type and/or segmented curing mold.

In particular embodiments shown in FIGS. 1-7, a split-type tire curing mold 10 comprises an upper mold portion 20 and a lower mold portion 30. Each mold portion 20, 30 is generally segmented into a plurality of sections 24, 34 respectively. One or more side plates 22, 32 form a ring and engage the plurality of sections 24, 34 to form a tire molding cavity 18, where the side plates 22, 32 are associated with a sidewall of the cured tire, and sections 24, 34 are generally associated with the tread area of the cured tire. In particular embodiments, upper mold back ring 21 and upper side plates 22 are connected to an upper base plate 26, while lower mold back ring 31 and lower side plates 34 are connected to a lower base plate 36. Mold back rings 21, 31 may form a singly formed unit, or it may be assembled from a plurality of components. Any upper or lower base plate 26, 36 may be formed of one or more sections or components. Upper and lower sections 24, 34 are slidably engaged with each corresponding (adjacent) mold back ring 21, 31. As the upper base plate 26 raises mold upper portion 20 during a mold opening operation, each upper section 24 translates downwardly and radially outwardly relative to upper mold back ring 21 along an inclined mold back surface 21a and section surface 27, but are ultimately raised upward relative a mold centerline CL by virtue of the upward movement of the upper base plate 26. In particular embodiments, lower base plate 36 remains fixed during mold opening and closing operations, although it is contemplated in other embodiments that lower base plate 36 may translate during mold opening and closing procedures in similar or dissimilar fashion as upper base plate 26 as described herein. It is also contemplated in other embodiments that upper base plate 26 may remain fixed instead of lower base plate 36, where lower base plate 36, lower mold back ring 31, and lower sections 34 would operate as upper base plate 26, upper mold back 21, and upper sections 24 are described herein. During mold opening operations, bottom sections 34 translate upwardly and outwardly relative to lower mold back ring 31. Inclined surfaces 27, 37 and 21a, 31a are generally inclined relative to mold centerline CL. Mold back rings 21, 31 retain the plurality of sections 24, 34 in expandable ring-like arrangements, whereby sections 24, 34 slide between open and closed positions along the inclined conical surfaces 21a, 31a of each mold back ring 21, 31. In particular embodiments, inclined surfaces 27, 37 of sections 24, 34, respectively, correspond to mold back inclined surfaces 21a, 31a, respectively for sliding engagement; however, it is contemplated that a surface or member may be located between the corresponding inclined surfaces of mold back rings 21, 31 and sections 24, 34 without departing from the scope of the invention. In other embodiments, a non-split mold is contemplated, wherein one of the upper or lower mold backs 21, 31 and the upper and lower sections 24, 34 are combined to form a plurality of sections that each extend between upper and lower side plates 22, 32.

During a mold closing operation, closing forces are transmitted through upper base plate 26, according to the embodiments shown in the FIGURES. Upper base plate 26 forces upper sections 24 into contact with lower sections 34 along surfaces 29, 39. At the same time, upper base plate 26 forces upper mold back ring 21 vertically downward, thereby directing sections 24, 34 radially inward and downward, although sections 24 generally more specifically translate upward and inward along surfaces 27 relative to mold back ring 21, and sections 34 translate downward and inward along surfaces 37 of sections 34 mold back ring relative to mold back ring 31. More specifically, surface 27 of each upper section 24 slides along surface 21a of mold back ring 21, and surface 37 of each section 34 slides along surface 31a of mold back ring 31. The radial translation causes upper sections 24 to engage corresponding side plates 22 along surfaces 23, 25, and lower sections 34 to engage corresponding side plates 32 along surfaces 33, 35. Concurrently, sections 24, 34 engage the side surfaces (not shown) of adjacent sections 24, 34 to form an upper and lower annulus of upper sections 24 and lower sections 34, respectively. Sections 24, 34 also engage corresponding base plates 26, 36. After mold 10 is closed about a green tire, the mold is internally pressurized to force the green tire against the surfaces of inner tire molding cavity 18.

Figure 3:
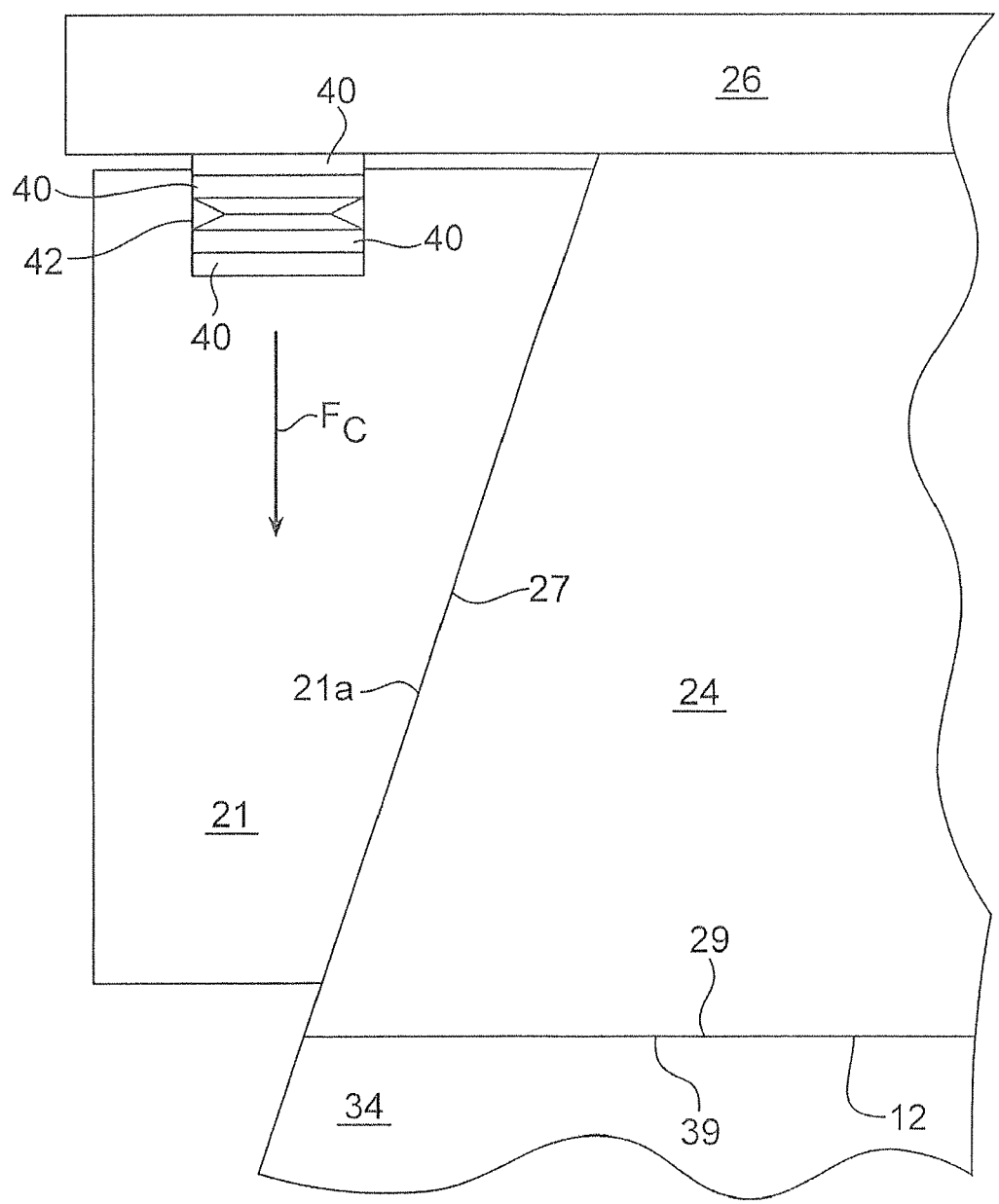
FIG. 3 is an enlarged partial sectional side view of the mold as shown in FIG. 1.
Figure 6:
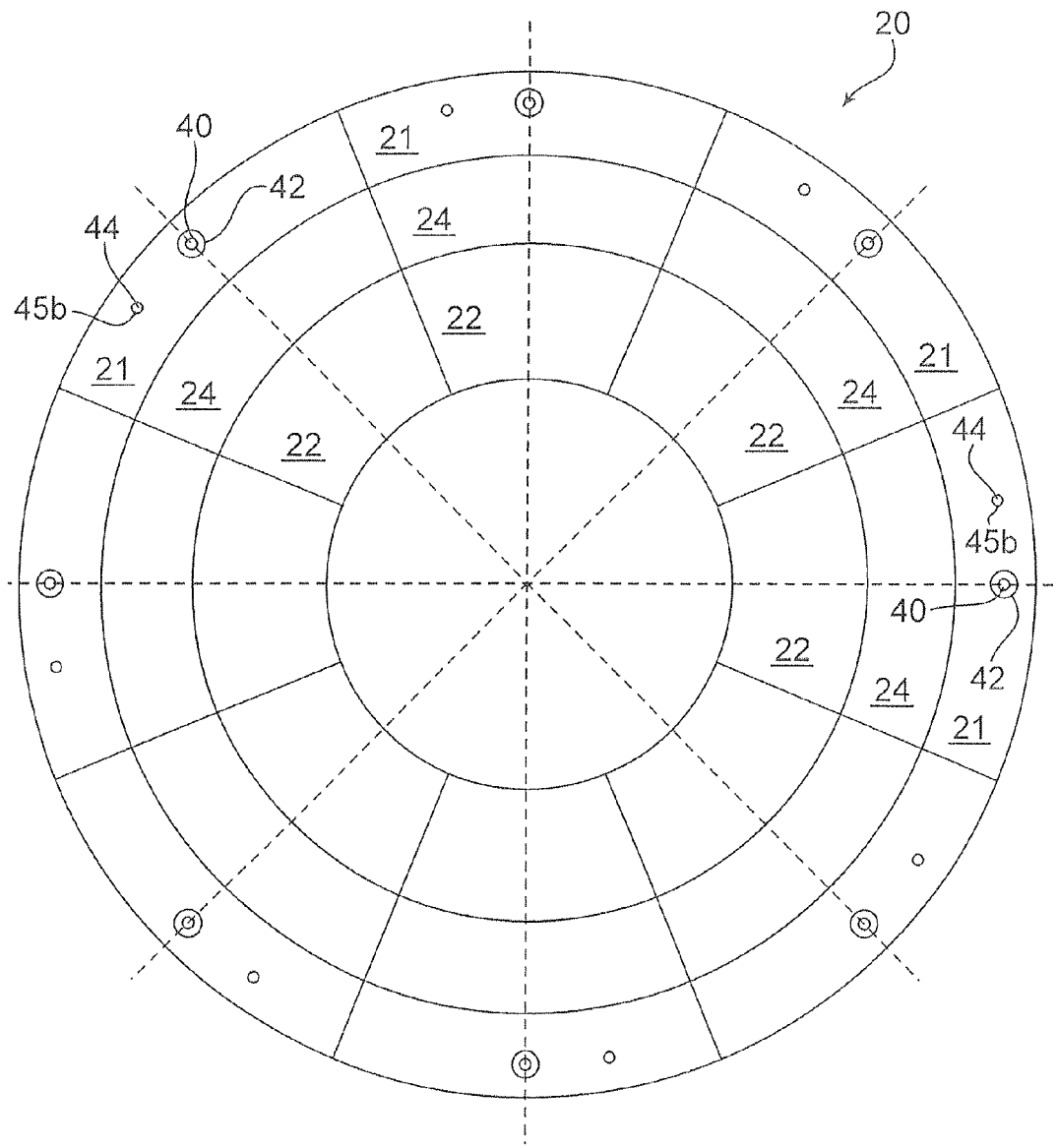
FIG. 6 is a top sectional view of the mold shown in FIG. 1, taken along line 6-6.

With general reference to FIGS. 1, 3, and 6, a plurality of displacement members 40 may be placed between upper mold back ring 21 and upper base plate 26, and between lower mold back ring 31 and lower base plate 36 to tightly arrange sections 24, 34 against adjacent sections 24, 34 and side plates 22, 32, subsequent mold closure. This would substantially close any gaps remaining in mold 10 subsequent mold closure, and substantially align any sections 24, 34 with each other as well as any side plate 22, 32 to form a properly aligned tire molding cavity 18. In other embodiments, displacement members 40 may be used in non-split molds, as described above, wherein the plurality of displacement members 40 would be used in association with one mold back 21, 31 that would engage a plurality of sections extending between upper and lower side plates 22, 32.

In one embodiment, displacement members 40 are springs that provide a closing force $F_C$, for the purpose of alleviating (i.e., closing) any gaps or misalignments that would otherwise exist between mold components, such as sections 24, 34 and side plates 22, 32, when the mold is in a generally closed position. In particular embodiments, as shown exemplary in FIGS. 1, 3, 6, 7 and 8, springs may comprise cupped spring washers (which are non-flat), also known as Belleville washers, which are high force, low displacement springs. In one embodiment, Belleville washers each provide 1-2 millimeters of displacement. Any quantity of spring washers may be stacked and arranged in any orientation as desired to achieve a desired spring force. In other words, spring washers may be stacked upside-up, upside-down, or any combination thereof. In the FIGURES, the arrangement or group of spring washers includes two (2) spring washers arranged upside-down, which are placed atop two (2) washers arranged upside-up. It is known in the art that the arrangement of a quantity of spring washers will affect the over-all spring force of the stacked grouping. The spring force for any assembly of displacement members 40 acting about any mold back ring 21, 31 should collectively be able to overcome and resist the internal pressure of the mold 10, which attempts to open or separate the mold components during a curing operation, such as sections 24, 34, respectively. Further, such collective spring force should not be greater than the mold 10 closing force, as otherwise the mold would open due to the application of the spring force. In particular embodiments, internal pressure of the mold equates to approximately 25 tons of force. It is contemplated that displacement members 40 may comprise other known springs, such as, for example, leaf or coil springs, as well as any other known devices capable of achieving the forces and displacements desired for particular applications.

In another embodiment, the displacement members 40 comprise a plurality of Belleville springs or washers arranged in a coaxial stack. During closing and opening of the mold, the stack of Bellville washers may slip from the coaxial arrangement without some means of constraint. This constraint could be provided by a precision machining of the inside diameter of the cavity 42 to match the outside diameter of the Belleville washers. The present embodiment provides a simplified solution. A pin 56 is inserted through the center holes of the washers. The pin 56 is used to maintain the washers in a coaxial arrangement without limiting the vertical compression of the washers. Therefore, the axial length of the pin must have a length sufficiently long to engage all washers in the stack when the mold is open or during its assembly and this length must be sufficiently short so that the force from the upper base plate 26 is transmitted to the mold back ring 21 through the stack of Belleville washers, i.e. the mold back ring must not "bottom out" on the pin 56.

A further aspect of this embodiment has a pin 56 that may include a ridge around the circumference of one end. The process of making the Belleville washers deforms a planar metal blank, for example a metal stamping, to the finished, functional shape, domed or frustroconical. Therefore, the center hole inherently has a decreasing interior diameter. The present embodiment takes advantage of this shape to provide a way to suspend the pin 56 within the stack of washers. The ridge has a diameter that is intermediate between the inner and outer edges of the washer. This causes the pin 56 to catch on the decreasing interior diameter of the top washer and to suspend the pin within the stack of washers. Particular embodiments of the present invention utilize a pin suspended in the stack of washers by a ridge to ensure less than or equal to half engagement with the top and bottom washers. Without the ridge on the pin, the pin drops to the bottom of the stack of washers possibly without engagement with the top washer. With the ridge, the pin is suspended with less than half to half engagement with the top and bottom washers allowing space for compression of the washers.

Figure 8:
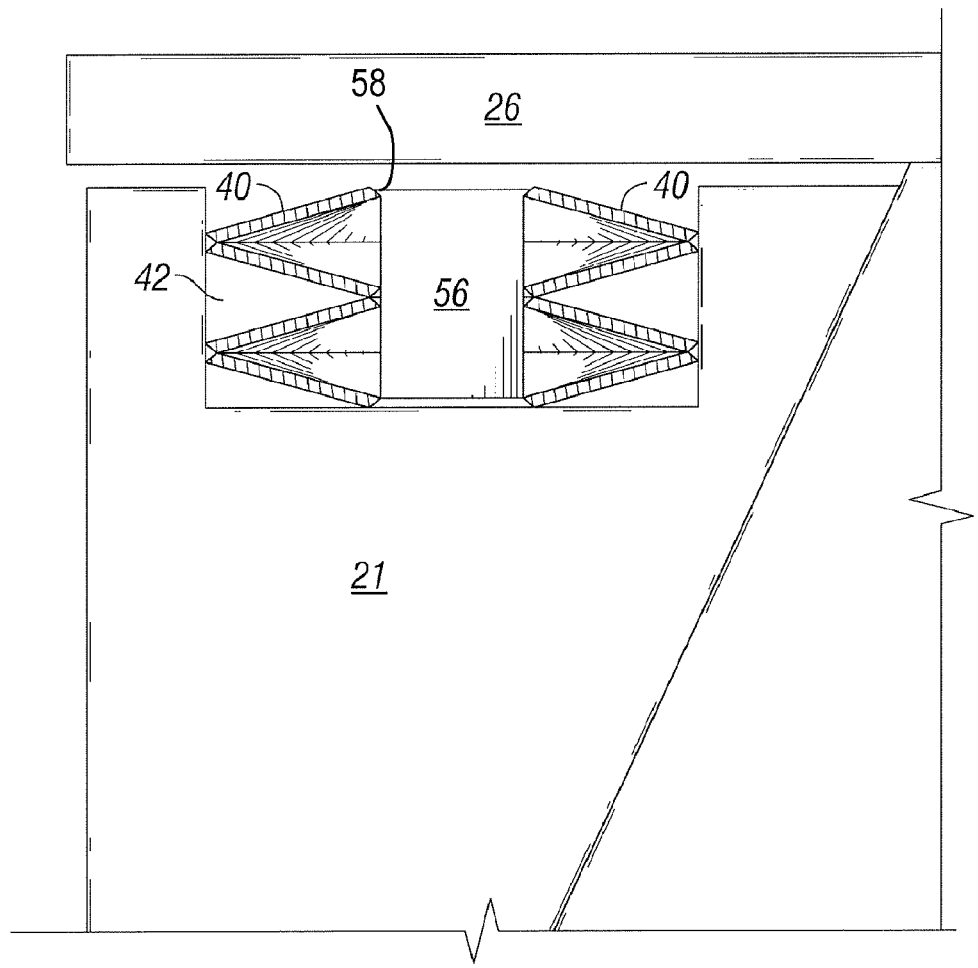
FIG. 8 is an enlarged partial sectional side view of the mold showing an alternative embodiment.

This embodiment is specifically illustrated in FIG. 8, where the Belleville washers 40 are shown as two cupped pairs with the ridge 58 of the pin 56 suspending the pin 56 from the decreasing interior diameter of the top washer.

An alternative solution for centering the washers, as known in the art, is to create a cap on the pin, similar to a bolt, to hold the pin above the first washer but the solution did not allow the direct compression of the washers from one mold part to another mold part. The force of compression is needed between the base plate 26, 36 and the mold back ring 21, 31 to remove any gaps caused by improperly designed or worn components.

With general reference to FIGS. 1 and 3, displacement members 40 are generally placed between upper mold back ring 21 and upper base plate 26, and between lower mold back ring 31 and lower base plate 36. In particular embodiments, shown by way of example in the FIGURES, one or more of a plurality of displacement members 40 engage a base plate 26, 36, and one or more of the plurality of displacement members 40 engage a corresponding mold back ring 21, 31 (i.e., within a grouping of displacement members 40). In other embodiments, one of the plurality of displacement members engages both a base plate 26, 36 and the corresponding mold back ring 21, 31 (such as, for example, when a single displacement member is located between a base plate 26, 36 and a corresponding mold back ring 21, 31).

In particular embodiments, such as the embodiment shown in FIGS. 1, 3, 6, and 7, one or more displacement members 40 may be placed in a retention cavity 42. In the embodiment shown in the FIGURES, cavity 42 is located along surface 21b, 31b of each mold back ring 21, 31. It is contemplated that cavity 42 may in the alternative be located in the corresponding base plate 26, 36, or, in other embodiments, a second cavity 42 may be formed in the corresponding base plate 26, 36 opposite a cavity 42 formed in the associated mold back ring 21, 31 (so that displacement members 40 extend into both corresponding pairs of mold back rings and base plates). It is contemplated that, in other embodiments, displacement members 40 may extend between base plates 26, 36 and corresponding mold back rings 21, 31 without the existence of any cavity 42. In lieu thereof, a fastener or other means may be used to constrain displacement members 40 to a location along mold back rings 21, 31, which may extend through or about displacement members 40 and into mold back rings 21, 31 and/or base plates 26, 36.

Figure 2:
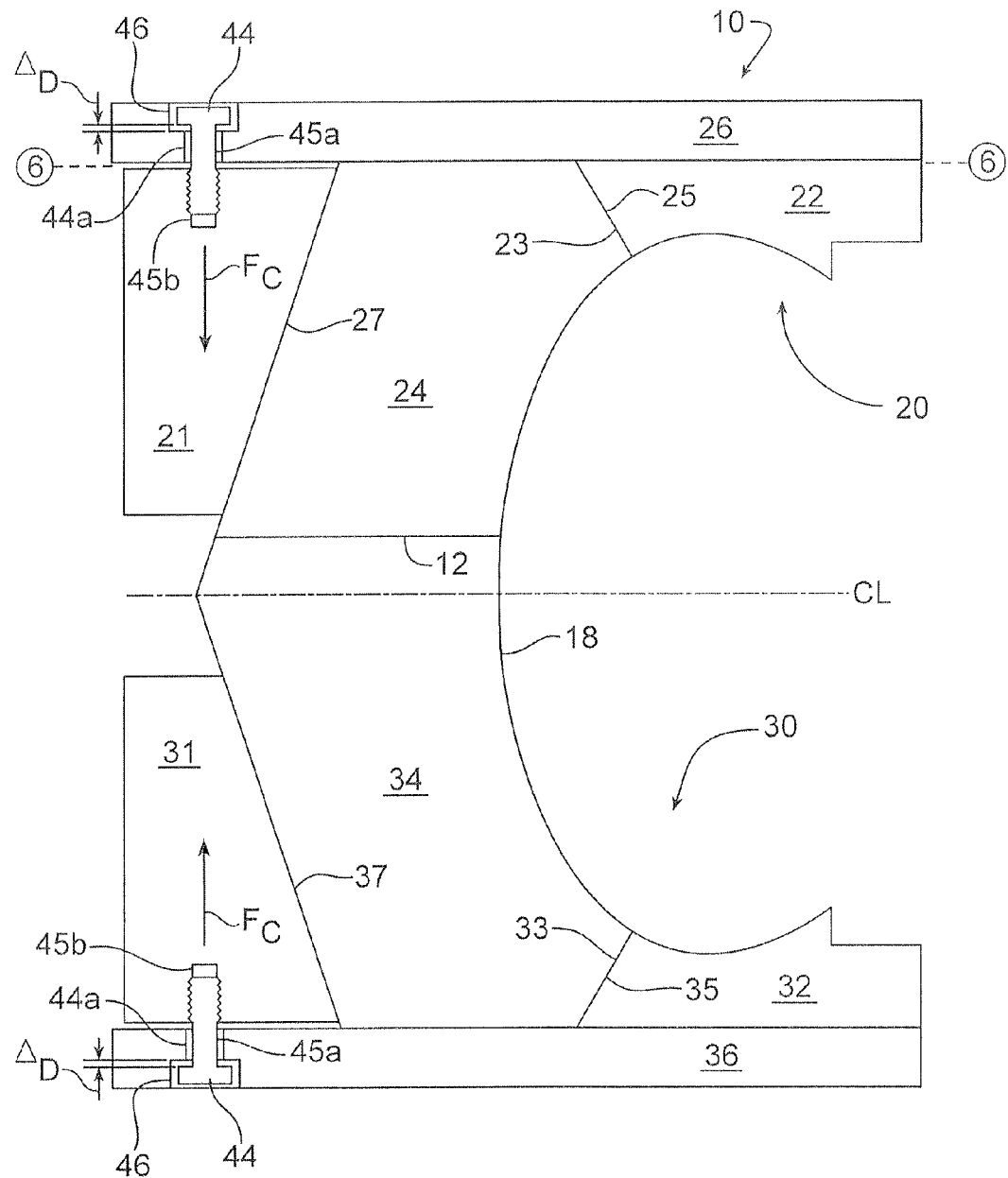
FIG. 2 is a sectional side view of the mold shown in FIG. 1, taken at a different circumferential location of the mold.
Figure 4:
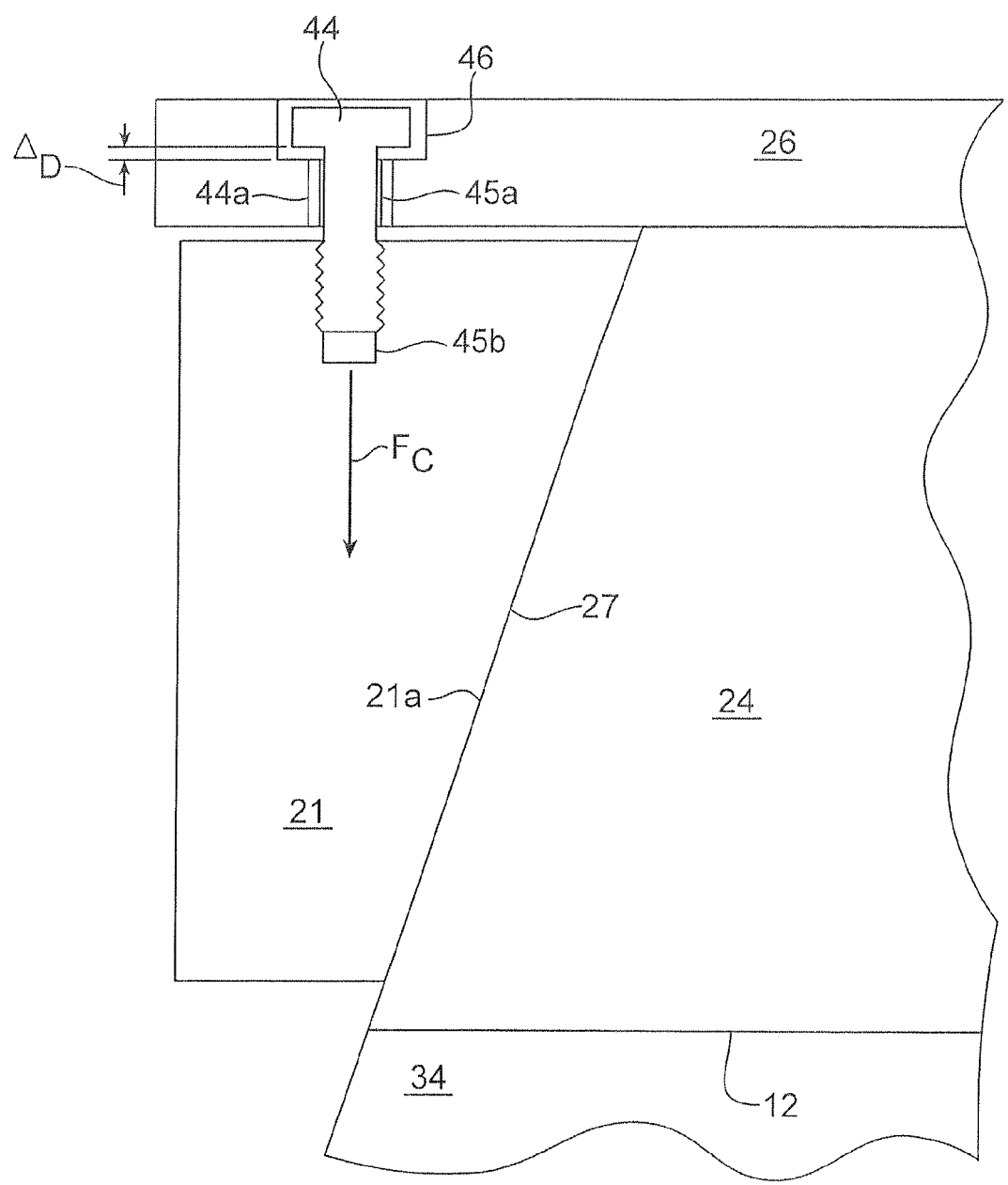
FIG. 4 is an enlarged side sectional view of the mold as shown in FIG. 2.
Figure 5:
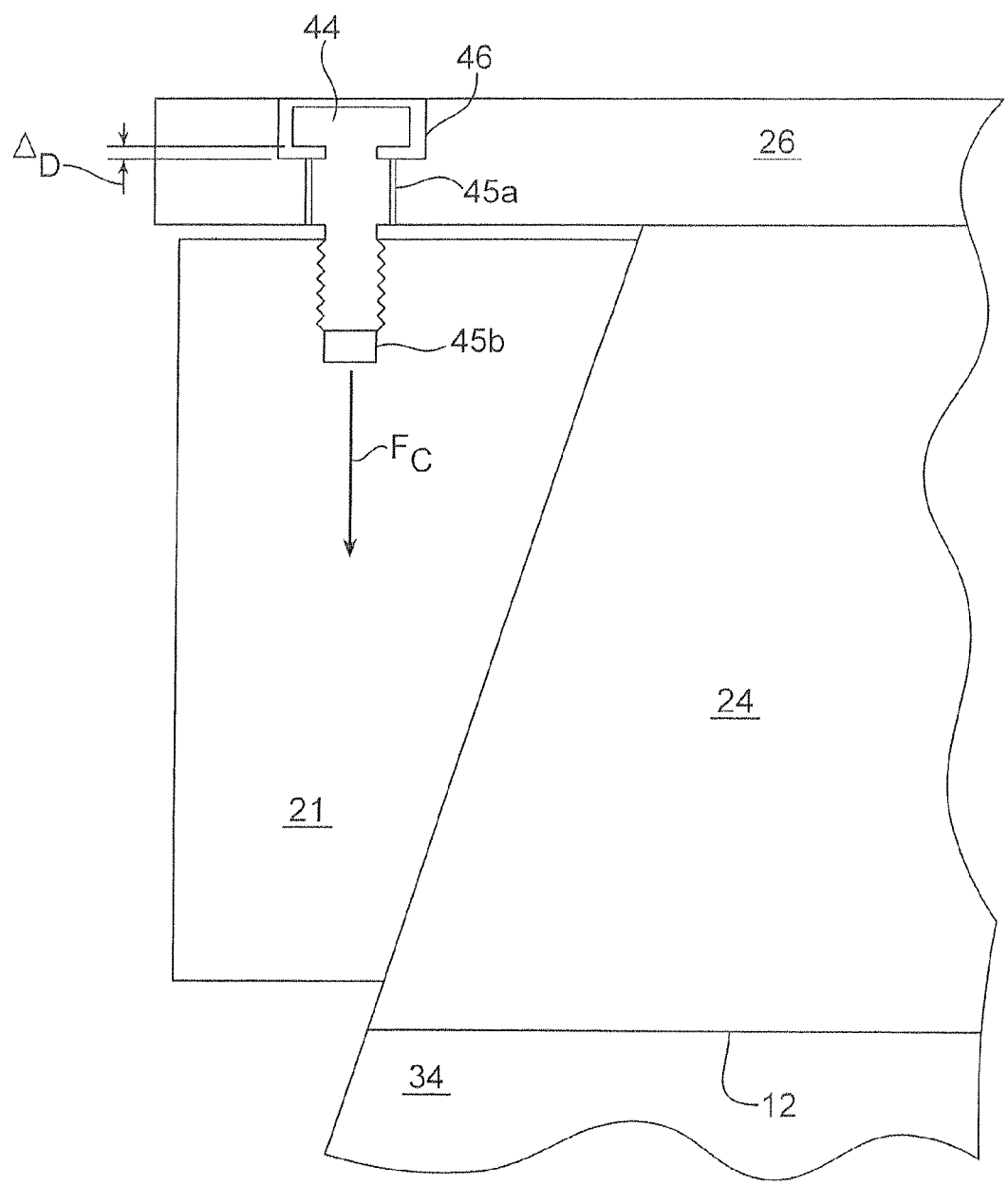
FIG. 5 is an enlarged sectional side view showing an alternative embodiment of the mold shown in FIG. 4.

With reference to FIGS. 2, 4, and 5, mold back rings 21, 31 are generally slidably attached to adjacent base plates 26, 36 for the purpose of providing translation of one or more mold back rings 21, 31 relative to the corresponding base plate 26, 36. In the embodiments shown, a fastener 44 extends between corresponding base plates 26, 36 and mold back rings 21, 31 at a plurality of locations around mold 10. In the embodiments shown in the FIGURES, each fastener 44 extends through, and without attachment to, a base plate 26, 36 and is secured into an adjacent mold back ring 21, 31, such as, for example, by way of threaded or adhesive attachment. In the embodiments shown in the FIGURES, threaded attachment is provided. Accordingly, each fastener 44 is slidable relative to a corresponding base plate 26, 36. An aperture 45a is provided in base plates 26, 36 for insertion of fastener 44, while aperture 45b is provided in mold back ring 21, 31 for receipt and securement of fastener 44. A cavity 46 may be provided in base plates 26, 36 for receipt of any head of fastener 44, for the purpose of acting as a countersink and maintaining any head of fastener 44 below the outer surface of the corresponding base plate 26, 36. In other embodiments, it is contemplated that a fastener 44 may extend through or about displacement members 40, which may not only connect base plates 26, 36 and corresponding mold back rings 21, 31, but also constrain displacement members 40 in a desired location. It is also contemplated that other known means of attaching mold back rings 21, 31 to corresponding base plates 26, 36 may be used, which, for example, may include using one or more displacement members 40 to relationally connect mold back rings 21, 31 to corresponding base plates 26, 36.

In particular embodiments, exemplified by FIGS. 2 and 4, fastener 44 may extend through a sleeve 44a. In particular embodiments, fastener 44 slidingly engages sleeve 44a as displacement members 40 extend and compress. Although it is contemplated that a sleeve 44a may not exist, a sleeve 44a may be used as desired, such as when, for example, it is desired to provide a more durable material for interaction with fastener 44. In one embodiment, the fasteners 44 and sleeves 44a are formed of steel, and mold back rings 21, 31 are formed of aluminum. In another embodiment, exemplified by FIG. 5, fastener 44 is a shoulder bolt, which includes a portion having a larger outside diameter or thickness which may slidingly engage a corresponding surface of aperture 45a of corresponding base plate 26, 36.

Fastener 44 may be used to limit the extension of displacement members 40. As shown in FIGS. 2, 4, and 5, fastener 44 may be secured within a mold back ring 21, 31 to a depth that provides an offset distance $\Delta_D$ between a portion of fastener 44, which may be, for example, a head portion of the fastener or a washer, and a base plate surface. Offset distance $\Delta_D$ relates to the amount of displacement available for extension or expansion of displacement members 40. Offset distance $\Delta_D$ is a maximum distance when a corresponding mold back ring 21, 31 is positioned in close relation to an associated base plate 26, 36, which may be an abutted engagement. In other words, when displacement members 40 are in a configuration of maximum compression (i.e., a minimum height), which may be limited mechanically or kinematically by the interaction of mold components, offset distance $\Delta_D$ is a maximum. Maximum compression of displacement members 40 generally occurs when mold 10 is in a closed position. Offset distance $\Delta_D$ may be any distance. In one embodiment, maximum offset distance $\Delta_D$ is between 6 to 10 millimeters. The maximum offset distance $\Delta_D$ available is also the maximum distance that displacement members 40 may extend from a compressed state or configuration. It is contemplated that other means or configurations of controlling or limiting the extension or displacement provided by displacement members 40 may be used, and considered within the scope of this invention.

Displacement members 40 may be placed at multiple locations around the mold 10 to provide a more uniform distribution of gap closure forces around mold back rings 21, 31. With reference to the particular embodiment of FIG. 6, is it shown that each mold back ring 21, 31 may include a plurality of independent groupings or assemblies of one or more displacement members 40. More specifically, is it shown that an independent grouping of displacement members 40 may be positioned for independent association with an adjacent section 24, 34. In other words, a grouping of one or more displacement members 40 may be provided for each section 24, 34. In FIG. 6, there are eight (8) sections 24, and eight (8) groupings of displacement members 40 are provided, where each grouping is positioned adjacent one of the sections 24. It is contemplated, however, that the quantity of displacement member 40 groupings provided in each mold back ring 21, 31 may be greater or less than the quantity of associated sections 24, 34, respectively. FIG. 6 also shows that displacement members 40 may be centrally located along an associated mold back ring 21, 31 in relation to an adjacent section 24, 34. In other embodiments, it is contemplated that groupings of displacement members 40 may be located in any off-center position relative to any adjacent section 24, 34. Off-center positioning and providing less displacement members 40 than corresponding sections 24, 34 is contemplated because each mold back ring 21, 31 may be a unitary ring, which is capable of applying and distributing the pre-load force of any displacement members 40 beyond a single, independent section 24, 34.

Figure 7:
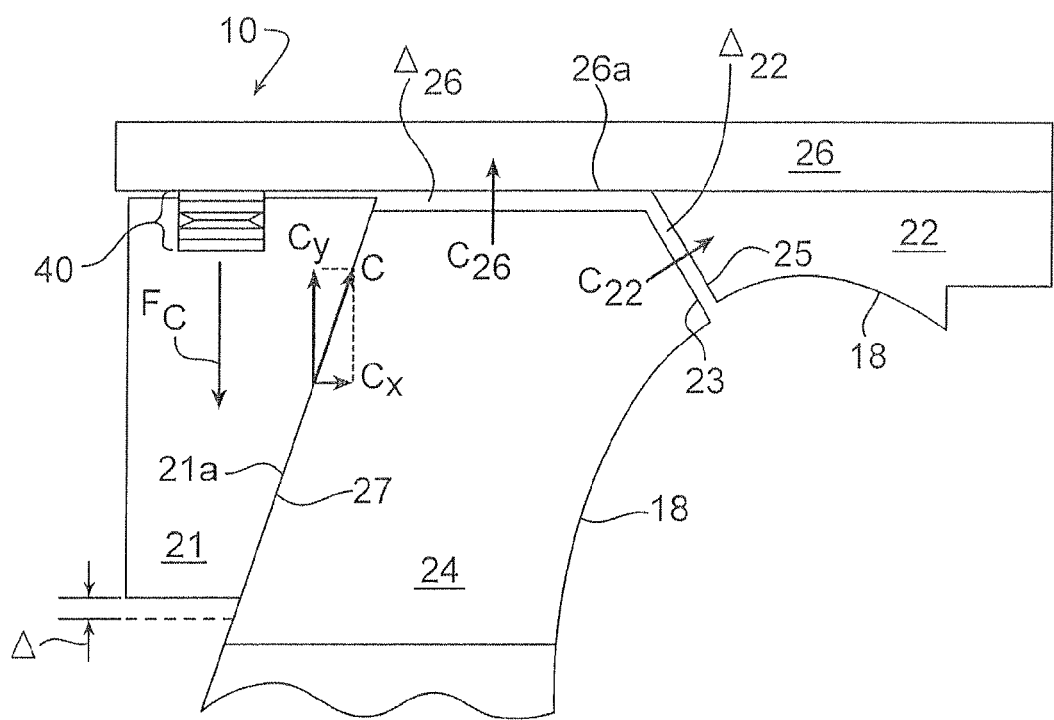
FIG. 7 is an enlarged view of the mold shown in FIG. 1, showing the mold in a substantially closed operation prior to gap closure by the displacement members (non-sectional side view).

In operation, at least one base plate 26, 36 is translated from an open position toward a closed position. Accordingly, any such base plate 26, 36 forces a corresponding mold back ring 21, 31 and sections 24, 34 toward a closed position. When one or more gaps exist about one or more sections 24, 34, a closing force $F_c$ generated by displacement members 40 is capable of forcing a corresponding mold back ring 21, 31 to translate corresponding sections 24, 34 to overcome and close any such gaps. As shown in FIG. 7, for example, with reference to upper mold portion 20, one or more gaps may exist, such as $\Delta_{22}, \Delta_{26}$, or gaps between adjacent sections 24, a closing force $F_c$ generated by displacement members 40 is capable of forcing a corresponding mold back ring 21 away from a corresponding base plate 26 a distance $\Delta$ to alleviate any such gap. As mold back ring 21 translate, closing force $F_c$ causes corresponding sections 24 to translate toward a final closed position. Specifically, corresponding surfaces 27 of sections 24 translate in direction C along corresponding surfaces 21a of mold back ring 21. Accordingly, because each section surface 27 is inclined, sections 24 translate in two directions, namely, in direction $C_Y$, which directs sections 24 toward corresponding base plate 26, and in direction $C_X$, which directs sections 24 towards a corresponding side plate 22. Additionally, sections 24 close upon adjacent sections 24 to engage side surfaces thereof, for the purpose of forming a ring-like structure when mold 10 is in a closed position, as shown generally in FIG. 6. Because each section 24 is able to translate in two primary directions ($C_X$ and $C_Y$), displacement members 40 are capable of not only closing gap $\Delta_{22}$ (existing along molding cavity 18) in direction $C_{22}$, but also closing gap $\Delta_{26}$ in direction $C_{26}$, which properly align sections 24, 34 and side plates 22, 32 for the purpose of providing a properly contoured tire molding cavity 18. Although the above discussion surrounds the components of upper mold portion 20 and gaps existing about upper sections 24, such discussion is applicable to and describes the operation of displacement members 40 along the lower base plate in association with lower sections 34. Accordingly, gaps $\Delta_{22}$ and $\Delta_{26}$ as shown in the FIGURES are representative of any gaps that may occur along bottom sections 34, which are not shown.

Therefore, displacement members 40 are able to substantially close gaps located adjacent tire molding cavity 18 for the purpose of preventing the formation of flashing and rubber loss, and additionally, are able to align sections 24, 34 relative to the tire molding cavity 18 for the purpose of providing a smooth contoured tire molding cavity 18. Otherwise, one or more sections 24, 34 may be misaligned relative to an associated side plate 22, 32, causing one of the sections or side plates to protrude into the tire molding cavity 18. Also, because there are displacement members 40 along the upper and lower mold portions 20, 30, adjustments to the final closed position of mold 10 (namely, sections 24, 34) are able to occur independently between the upper and lower portions 20, 30 as necessary to alleviate independent gaps. It also allows a portion of the tire molding cavity 18, associated with the upper or lower mold portion 20, 30, to be corrected (aligned) without misaligning other portions of the tire mold cavity associated with the other of the upper or lower mold portions 20, 30, as the upper and lower portions 20, 30 are capable of acting independently (being corrected independently via associated upper and lower displacement members 40).

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire curing mold capable of operating between mold open and mold closed positions, the mold comprising:
    a first plurality of translatable sections arranged annularly about a tire molding cavity to form a tread portion of the tire molding cavity, the sections translatable in a radial direction of the tire molding cavity between the mold open and mold closed positions;
    one or more first side plates arranged annularly about the tire molding cavity to form a sidewall portion of the tire molding cavity, the one or more first side plates further being positioned for engagement with the first plurality of translatable sections in the mold closed position;
    a first mold back ring arranged to slidably engage the first plurality of translatable sections, the first mold back ring also being slidably attached to a first base plate, whereby the first plurality of translatable sections radially translate with movement of the first base plate as the mold operates between the mold open and the mold closed positions; and,
    a first plurality of displacement members extending from the first base plate to the first mold back ring at a plurality of locations around the mold, the first plurality of displacement members generating a closing force directed against the first mold back ring to apply a further force against the first plurality of translatable sections when the mold is in the mold closed position.

2. The curing mold of claim 1, further comprising:
a first plurality of retention cavities located in at least one of the first mold back ring and the first base plate at the plurality of locations, each retention cavity receiving one or more of the first plurality of displacement members.

3. The curing mold of claim 1, further comprising:
a first plurality of fasteners slidably attaching the first mold back ring to the first base plate and extending within the first base plate and the first mold back ring, each of the plurality of fasteners being slidable relative to the first base plate.

4. The curing mold of claim 3, wherein the first plurality of displacement members and the first plurality of fasteners are located at different locations along the mold.

5. The curing mold of claim 1, wherein one or more of the first plurality of displacement members engage the first base plate, and one or more of the first plurality of displacement members engage the first mold back ring.

6. The curing mold of claim 1, wherein each of the first plurality of displacement members is a spring.

7. The curing mold of claim 6, further comprising a pin slidably arranged to extend through one or more of the first plurality of displacement members.

8. The curing mold of claim 7, wherein the pin has a ridge comprising a radially outward extension of the pin, the ridge engaging one of the first plurality of displacement members such that the pin is suspended from the one of the first plurality of displacement members.

9. The curing mold of claim 1, wherein the first mold back ring is arranged relative to the first plurality of sections to translate the first plurality of sections towards the first base plate and inwards towards the one or more first side plates.

10. The curing mold of claim 1, wherein the first mold back ring includes an inclined surface and each of the first plurality of sections includes a corresponding inclined surface for sliding engagement with the first mold back ring, each of the surfaces being inclined relative to a mold centerline that extends between the one or more first side plates and one or more second side plates located substantially opposite the one or more first side plates.

11. The curing mold of claim 1, wherein each of the first plurality of sections includes an inclined surface for sliding engagement with the first mold back ring, the inclined surface forming a direction of translation for the first plurality of sections, wherein the direction of translation directs the first plurality of sections toward the first base plate and the one or more first side plates.

12. The curing mold of claim 1, further comprising:
a second plurality of translatable sections arranged annularly about the tire molding cavity to form a tread portion of the tire molding cavity, the sections translatable in a radial direction of the tire molding cavity between the mold open and mold closed positions, the second plurality of sections engaging one or more second side plates of annular arrangement when in the closed molding position;
a second mold back ring arranged to slidably engage the second plurality of translatable sections, the second mold back ring also being slidably attached to a second base plate, whereby the second plurality of translatable sections radially translate with movement of the second base plate as the mold operates between the mold open and the mold closed positions; and,
a second plurality of displacement members extending from the second base plate and the second mold back ring at a plurality of locations around the mold, the second plurality of displacement members generating a closing force directed against the second mold back ring to apply a further force against the second plurality of translatable sections when the mold is in the mold closed position.

13. The curing mold of claim 12, further comprising:
wherein the second plurality of translatable sections engages the first plurality of translatable sections along a parting line in the mold closed position.

14. The curing mold of claim 12, further comprising:
a second plurality of retention cavities located in at least one of the second mold back ring and the second base plate at the plurality of locations, each retention cavity receiving one or more of the second plurality of displacement members.

15. The curing mold of claim 12, further comprising:
a second plurality of fasteners extending between the second base plate and the second mold back ring at a plurality of locations around the mold, the plurality of fasteners being slidable relative to the second base plate.

16. The curing mold of claim 15, wherein the second plurality of displacement members and the second plurality of fasteners are located at different locations along the mold.

17. The curing mold of claim 12, wherein each of the second plurality of displacement members is a spring.

18. The curing mold of claim 17, further comprising a pin slidably arranged to extend through each of the first plurality of displacement members.

19. The curing mold of claim 3, where each of the first plurality of fasteners comprise a shoulder bolt.

20. The curing mold of claim 3, where each of the first plurality of fasteners comprise a fastener extending through a sleeve.

* * * * *